No. 643,200. Patented Feb. 13, 1900.
C. M. RANKERT.
CLAMP FOR REPAIRING LEAKS IN PIPE JOINTS.
(Application filed July 31, 1899.)
(No Model.)
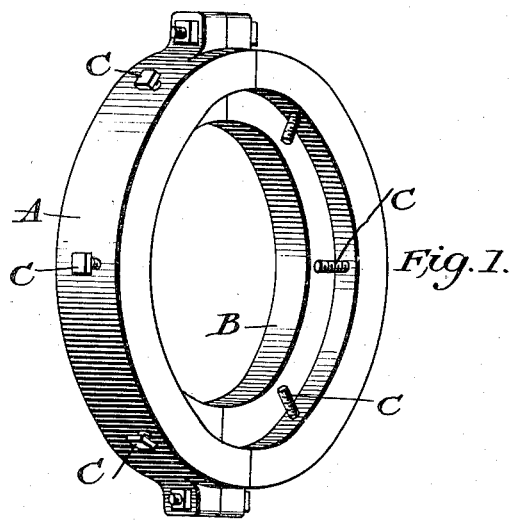
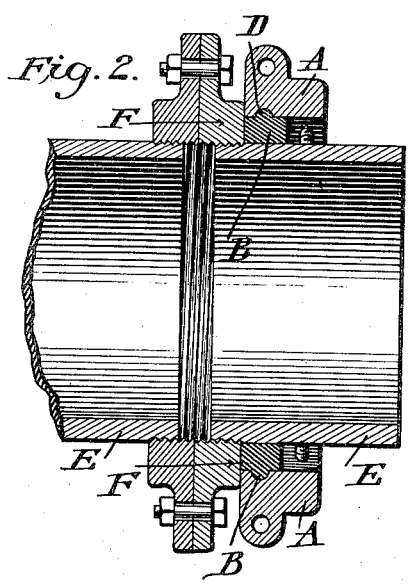
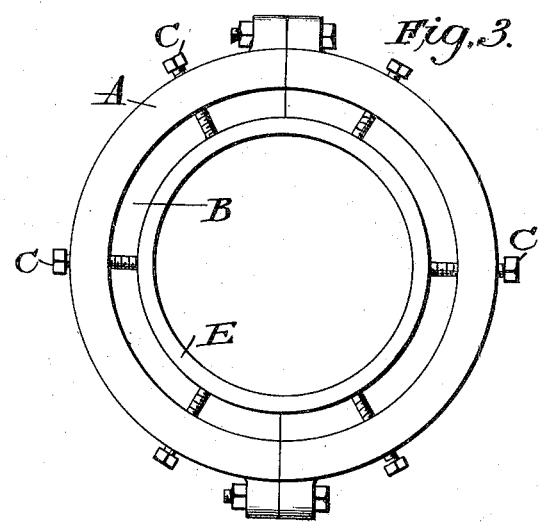
Witnesses:
A. W. McFarland
Ed. H. McFarland
Inventor:
Charles M Rankert

UNITED STATES PATENT OFFICE.

CHARLES M. RANKERT, OF CHICAGO, ILLINOIS.

CLAMP FOR REPAIRING LEAKS IN PIPE-JOINTS.

SPECIFICATION forming part of Letters Patent No. 643,200, dated February 13, 1900.

Application filed July 31, 1899. Serial No. 725,708. (No model.)

*To all whom it may concern:*

Be it known that I, CHARLES M. RANKERT, a citizen of the United States, residing at Chicago, in the county of Cook, State of Illinois, have invented a new Clamp for Repairing Leaks in Pipe-Joints, of which the following is a specification.

My invention relates to improvements in a clamp for stopping leaks in pipe-joints.

This clamp consists of sections which are bolted together.

This clamp is composed of two metallic concentric rings, the outer ring serving as a retainer for the inner ring, which latter is of a flexible metal. The retaining-ring contains set-screws for holding the clamp securely in position on the pipe.

The objects of my improvement are, first, to provide a substantial retaining-ring containing a flexible metal which is calked into the leaky crevices; secondly, to provide ease in placing it on the pipe; thirdly, to provide against displacement on the pipe by clamping, and, fourthly, to provide against displacing of the clamp by means of set-screws, as shown. I attain these objects by the mechanism illustrated in the accompanying drawings, in which—

Figure 1 is a perspective view of the entire clamp. Fig. 2 is a longitudinal section of clamp in place on a pipe. Fig. 3 is an end view of clamp in place on a pipe.

Similar letters refer to similar parts throughout the several views.

A is a retaining-ring, consisting of sections which are bolted together so as to clamp securely to the pipe E. The inner flexible-metal ring B, which is to be calked against flange F, retaining-ring A, has on its inner surface a groove D to hold flexible-metal ring D in place. Set-screws C, Fig. 3, prevent clamp from sliding on pipe E.

What I claim as my invention, and desire to secure by Letters Patent, is—

1. The combination of a metallic retaining-ring consisting of sections bolted together, and of an interior diameter larger than the exterior diameter of the pipe, means for securing the same rigidly upon the pipe, and a flexible or soft metal ring retained between the pipe and said retaining-ring and adapted to be calked against the fitting upon the end of said pipe.

2. The combination of a sectional retaining-ring adapted to be rigidly secured upon the pipe leaving an annular space between it and said pipe and a flexible or soft metal ring engaged in said space and by rib and groove with said vertical ring and adapted to be calked upon the fitting upon the pipe.

CHARLES M. RANKERT.

Witnesses:
E. H. MCFARLAND,
A. W. MCFARLAND.